US011473705B2

(12) United States Patent
Furcoiu (10) Patent No.: US 11,473,705 B2
(45) Date of Patent: Oct. 18, 2022

(54) JOINT RESTRAINT DEVICE

(71) Applicant: MUELLER INTERNATIONAL, LLC, Atlanta, GA (US)

(72) Inventor: Aurelian Ioan Furcoiu, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 339 days.

(21) Appl. No.: 16/109,204

(22) Filed: Aug. 22, 2018

(65) Prior Publication Data
US 2020/0063900 A1    Feb. 27, 2020

(51) Int. Cl.
*F16L 23/02* (2006.01)
*F16L 23/16* (2006.01)
*F16L 23/028* (2006.01)

(52) U.S. Cl.
CPC ........... *F16L 23/0283* (2013.01); *F16L 23/16* (2013.01)

(58) Field of Classification Search
CPC ....... F16L 23/0283; F16L 23/16; F16L 19/02; F16L 19/0206; F16L 19/0237; F16L 19/106; F16L 19/12; F16L 21/007; F16L 21/03; F16L 21/08; F16L 23/18; F16L 47/14; F16L 47/08; F16L 37/02; F16L 21/04; F16L 37/127
USPC ...... 285/368, 133.11, 133.21, 335, 339, 342, 285/343, 345, 356, 363, 364, 374, 379, 285/399, 400, 405, 412, 413, 414, 910, 285/337
See application file for complete search history.

(56) References Cited

U.S. PATENT DOCUMENTS

| 1,945,293 | A |   | 1/1934  | Pierce |              |
|-----------|---|---|---------|--------|--------------|
| 1,964,044 | A |   | 6/1934  | Engel  |              |
| 2,355,407 | A |   | 8/1944  | Wyss   |              |
| 2,394,351 | A | * | 2/1946  | Wurzburger | F16L 19/12 |
| 2,693,374 | A | * | 11/1954 | Wurzburger | F16L 19/10 |
|           |   |   |         |        | 285/343      |
| 2,887,328 | A |   | 5/1959  | Risley et al. |        |
| 3,081,102 | A |   | 3/1963  | Murray et al. |        |

(Continued)

FOREIGN PATENT DOCUMENTS

| CA | 2458710 | 8/2005 |
| CA | 2458788 | 8/2005 |

(Continued)

OTHER PUBLICATIONS

Furcoiu, Aurelian Ioan; International Search Report for PCT Application No. PCT/US18/23554, filed Mar. 21, 2018, dated Jun. 6, 2018, 10 pgs.

(Continued)

*Primary Examiner* — Zachary T Dragicevich
*Assistant Examiner* — William S. Choi
(74) *Attorney, Agent, or Firm* — Taylor English Duma LLP (57) ABSTRACT

A gland assembly includes a gland defining an annular ring, the annular ring defining a first gland end and a second gland end disposed opposite from the first gland end; and a gasket, the gasket defining a first gasket end and a second gasket end, the first gasket end disposed opposite from the second gasket end, a gasket bore extending through the gasket from the first gasket end to the second gasket end, a gland collar defined at the first gasket end, the gasket bore receiving the second gland end of the annular ring.

17 Claims, 10 Drawing Sheets

(56) References Cited

U.S. PATENT DOCUMENTS

| | | | |
|---|---|---|---|
| 3,150,876 A | 9/1964 | Lafferty | |
| 3,162,469 A | 12/1964 | Shohan | |
| 3,163,432 A | 12/1964 | De Boer | |
| 3,179,446 A | 4/1965 | Paterson | |
| 3,186,741 A | 6/1965 | Kurtz | |
| 3,211,472 A | 10/1965 | Rickard | |
| 3,249,371 A | 3/1966 | Peterman | |
| 3,252,192 A | 5/1966 | Smith | |
| 3,315,970 A | 4/1967 | Holoway | |
| 3,315,971 A | 4/1967 | Sakurada | |
| 3,414,273 A | 12/1968 | Sumner | |
| 3,432,190 A | 3/1969 | Kunz | |
| 3,485,515 A | 12/1969 | Frishof | |
| 3,573,871 A | 4/1971 | Warner et al. | |
| 3,642,306 A | 2/1972 | Gheen et al. | |
| 3,653,695 A | 4/1972 | Dunton et al. | |
| 3,680,874 A | 8/1972 | Schwarz | |
| 3,684,317 A | 8/1972 | Kazienko et al. | |
| 3,698,744 A | 10/1972 | Bevington | |
| 3,877,733 A | 4/1975 | Straub | |
| 3,889,989 A | 6/1975 | Legris | |
| 3,980,097 A | 9/1976 | Ellis | |
| 4,092,036 A | 5/1978 | Sato et al. | |
| 4,380,348 A | 4/1983 | Swartz | |
| 4,397,485 A | 8/1983 | Wood | |
| 4,410,479 A | 10/1983 | Cyriax | |
| 4,522,434 A | 6/1985 | Webb | |
| 4,538,841 A | 9/1985 | Royston | |
| 4,544,188 A * | 10/1985 | Dugger | F16L 21/04 285/337 |
| 4,568,112 A | 2/1986 | Bradley, Jr. et al. | |
| 4,569,542 A | 2/1986 | Anderson et al. | |
| 4,609,210 A | 9/1986 | Torokvei et al. | |
| 4,629,176 A | 12/1986 | Ceelen | |
| 4,664,426 A | 5/1987 | Ueki | |
| 4,741,356 A | 5/1988 | Letzo et al. | |
| 4,768,813 A | 9/1988 | Timmons | |
| 4,779,900 A | 10/1988 | Shumard | |
| 4,791,952 A | 12/1988 | Laurel | |
| 4,848,808 A | 7/1989 | Pannell et al. | |
| 4,858,968 A * | 8/1989 | Moebius | |
| 4,867,488 A | 9/1989 | Jones | |
| 4,890,967 A | 1/1990 | Rosenbaum | |
| 5,069,490 A | 12/1991 | Halen, Jr. | |
| 5,071,175 A | 12/1991 | Kennedy, Jr. | |
| 5,121,946 A | 6/1992 | Jardine | |
| 5,205,568 A | 4/1993 | Stoll et al. | |
| 5,232,252 A | 8/1993 | Bartholomew | |
| 5,297,826 A | 3/1994 | Percebois et al. | |
| 5,324,083 A | 6/1994 | Vogelsang | |
| 5,335,946 A | 8/1994 | Dent et al. | |
| 5,398,980 A | 3/1995 | Hunter | |
| 5,437,481 A | 8/1995 | Spears et al. | |
| 5,468,025 A | 11/1995 | Adinolfe et al. | |
| 5,476,292 A * | 12/1995 | Harper | F16L 21/04 285/337 |
| 5,498,042 A | 3/1996 | Dole | |
| 5,505,499 A | 4/1996 | Wallbank | |
| 5,544,922 A | 8/1996 | Shumard et al. | |
| 5,803,110 A | 9/1998 | Segal | |
| 5,851,037 A | 12/1998 | Bridges | |
| 5,941,576 A | 8/1999 | Krausz | |
| 6,019,396 A | 2/2000 | Saito et al. | |
| 6,106,029 A | 8/2000 | Demore et al. | |
| 6,173,993 B1 | 1/2001 | Shumard et al. | |
| 6,273,469 B1 | 8/2001 | Kwaske et al. | |
| 6,364,372 B1 | 4/2002 | Marandi | |
| 6,371,530 B1 | 4/2002 | Sato et al. | |
| 6,457,718 B1 * | 10/2002 | Quesada | F16L 21/03 |
| 6,481,762 B1 | 11/2002 | Rex et al. | |
| 6,830,268 B2 | 12/2004 | Krausz | |
| 7,232,160 B2 | 6/2007 | Krausz | |
| 7,243,955 B2 | 7/2007 | Krausz | |
| 7,469,939 B2 | 12/2008 | Westman et al. | |
| 7,571,940 B2 | 8/2009 | Krausz | |
| D602,127 S | 10/2009 | Shah et al. | |
| 7,625,018 B2 | 12/2009 | Krausz | |
| 7,654,586 B2 | 2/2010 | Krausz | |
| 7,748,753 B2 | 7/2010 | Krausz | |
| 7,837,238 B2 | 11/2010 | Krausz | |
| 7,883,126 B2 | 2/2011 | Terry et al. | |
| 7,997,626 B2 | 8/2011 | Krausz | |
| 7,997,628 B1 | 8/2011 | Smith, Jr. | |
| 8,042,816 B2 | 10/2011 | Krausz | |
| 8,313,124 B2 | 11/2012 | Krausz | |
| 8,408,606 B2 | 4/2013 | Krausz | |
| 8,651,530 B2 | 2/2014 | Krausz | |
| 8,857,861 B2 | 10/2014 | German | |
| 8,870,189 B2 | 10/2014 | Krausz | |
| 8,960,683 B2 | 2/2015 | Krausz | |
| 8,960,729 B2 | 2/2015 | Chiproot | |
| D724,185 S | 3/2015 | Chiproot | |
| 9,086,177 B2 | 7/2015 | Artsiely | |
| 9,109,701 B1 | 8/2015 | Copeland | |
| 9,163,760 B2 | 10/2015 | Lundstrom et al. | |
| 9,441,771 B2 | 9/2016 | German | |
| 9,890,883 B2 | 2/2018 | Maenishi et al. | |
| 10,018,290 B2 * | 7/2018 | Kishi | F16L 21/04 |
| 10,107,428 B2 | 10/2018 | Kim | |
| 10,677,381 B2 | 6/2020 | Furcoiu | |
| 10,774,508 B2 | 9/2020 | Furcoiu et al. | |
| 10,851,920 B2 | 12/2020 | Showkathali et al. | |
| 10,941,887 B2 | 3/2021 | Furcoiu | |
| 11,131,412 B2 | 9/2021 | Furcoiu | |
| 11,162,621 B2 | 11/2021 | Furcoiu | |
| 11,193,609 B2 | 12/2021 | Furcoiu et al. | |
| 11,199,280 B2 | 12/2021 | Furcoiu | |
| 11,215,306 B2 | 1/2022 | Furcoiu et al. | |
| 11,306,463 B2 | 4/2022 | Furcoiu et al. | |
| 11,313,504 B2 | 4/2022 | Furcoiu | |
| 11,396,964 B2 | 7/2022 | Furcoiu | |
| 11,396,965 B2 | 7/2022 | Mitchell et al. | |
| 2002/0017789 A1 | 2/2002 | Holmes | |
| 2002/0037194 A1 | 3/2002 | Gentile | |
| 2003/0085566 A1 | 5/2003 | Rex et al. | |
| 2004/0108713 A1 | 6/2004 | Krausz | |
| 2004/0232698 A1 | 11/2004 | Jones | |
| 2004/0232699 A1 | 11/2004 | Jones | |
| 2005/0194784 A1 * | 9/2005 | Jones | F16L 21/08 |
| 2005/0253380 A1 | 11/2005 | Gibb et al. | |
| 2006/0012172 A1 | 1/2006 | Kennedy, Jr. | |
| 2006/0087121 A1 | 4/2006 | Bradley | |
| 2007/0108766 A1 | 5/2007 | Riordan et al. | |
| 2007/0295406 A1 | 12/2007 | German et al. | |
| 2009/0243289 A1 | 10/2009 | Madara et al. | |
| 2010/0289256 A1 | 11/2010 | Shumard | |
| 2011/0084484 A1 * | 4/2011 | German | F16L 21/08 285/405 |
| 2011/0095519 A1 | 4/2011 | Krausz | |
| 2011/0291409 A1 | 12/2011 | Kennedy, Jr. et al. | |
| 2012/0025524 A1 | 2/2012 | Krausz | |
| 2012/0119485 A1 | 5/2012 | Cichorek et al. | |
| 2012/0299294 A1 | 11/2012 | Chiproot | |
| 2012/0299295 A1 | 11/2012 | Chiproot | |
| 2013/0056980 A1 | 3/2013 | Chiproot | |
| 2013/0328305 A1 | 12/2013 | Chiproot | |
| 2014/0001709 A1 | 1/2014 | Chiproot | |
| 2014/0319781 A1 | 10/2014 | Chiproot | |
| 2014/0319826 A1 | 10/2014 | Chiproot | |
| 2015/0176728 A1 | 6/2015 | Bowman | |
| 2015/0204468 A1 | 7/2015 | Jones | |
| 2016/0341343 A1 | 11/2016 | Bowsher et al. | |
| 2017/0030489 A1 * | 2/2017 | DeCesare | |
| 2017/0114933 A1 | 4/2017 | Copeland | |
| 2017/0130431 A1 | 5/2017 | Pinney et al. | |
| 2018/0306354 A1 | 10/2018 | Furcoiu | |
| 2018/0306361 A1 | 10/2018 | Furcoiu | |
| 2018/0306362 A1 | 10/2018 | Furcoiu | |
| 2019/0017636 A1 | 1/2019 | Furcoiu | |
| 2019/0145565 A1 | 5/2019 | Furcoiu | |
| 2019/0264843 A1 | 8/2019 | Furcoiu | |
| 2019/0331265 A1 | 10/2019 | Bowman | |
| 2020/0025321 A1 | 1/2020 | Furcoiu | |
| 2020/0071915 A1 | 3/2020 | Furcoiu et al. | |

(56) References Cited

U.S. PATENT DOCUMENTS

| | | | |
|---|---|---|---|
| 2020/0248847 A1 | 8/2020 | Furcoiu | |
| 2020/0248848 A1 | 8/2020 | Furcoiu | |
| 2020/0263814 A1 | 8/2020 | Furcoiu | |
| 2020/0332933 A1 | 10/2020 | Furcoiu et al. | |
| 2020/0354930 A1 | 11/2020 | Furcoiu et al. | |
| 2020/0370686 A1 | 11/2020 | Furcoiu et al. | |
| 2021/0018125 A1 | 1/2021 | Mitchell et al. | |
| 2021/0102647 A1 | 4/2021 | Furcoiu | |
| 2021/0324980 A1 | 10/2021 | Furcoiu | |
| 2021/0381632 A1 | 12/2021 | Furcoiu | |
| 2022/0018472 A1 | 1/2022 | Furcoiu et al. | |

FOREIGN PATENT DOCUMENTS

| | | | |
|---|---|---|---|
| CA | 2944828 | 11/2015 | |
| CN | 1894531 | 1/2007 | |
| CN | 202168185 | 3/2012 | |
| DE | 19837803 | 3/2000 | |
| DE | 202016100359 | 3/2016 | |
| EP | 0273999 | 7/1988 | |
| EP | 2463567 | 6/2012 | |
| EP | 2494249 | 9/2012 | |
| FR | 697255 | 1/1931 | |
| FR | 2830070 | 3/2003 | |
| GB | 1311434 | 3/1973 | |
| GB | 2346185 A * | 8/2000 | F16L 21/04 |
| GR | 3030125 | 7/1999 | |
| IL | 196511 | 1/2009 | |
| IL | 196817 | 2/2009 | |
| IL | 209936 | 12/2010 | |
| KR | 100946658 | 3/2010 | |
| KR | 101049449 | 7/2011 | |
| KR | 20140062744 A * | 5/2014 | |
| KR | 101418783 | 7/2014 | |
| KR | 20160082923 | 7/2016 | |
| WO | 2004048835 | 6/2004 | |
| WO | 2011123865 | 10/2011 | |
| WO | 2016108517 | 7/2016 | |
| WO | 2018194787 | 10/2018 | |
| WO | 2019212771 | 11/2019 | |
| WO | 2020040995 | 2/2020 | |
| WO | 2020050954 | 3/2020 | |
| WO | 2020146073 | 7/2020 | |
| WO | 2021015809 | 1/2021 | |

OTHER PUBLICATIONS

Mueller International, LLC; Presentation which includes descriptions and images of known restraint devices. The restraint devices were publicly available prior to Apr. 19, 2017, 39 pgs.

Furcoiu, Aurelian Ioan; Non-Final Office Action for U.S. Appl. No. 15/490,926, filed Apr. 19, 2017, dated Aug. 14, 2019, 30 pgs.

He Ford Meter Box Company, Inc.; Specification Sheet for MJ Gripping Style Restraint—(FUR-C-x-l style), published Feb. 7, 2019, 1 pg.

Furcoiu, Aurelian Ioan; Requirement for Restriction/Election for U.S. Appl. No. 15/966,796, filed Apr. 30, 2018, dated Sep. 27, 2019, 8 pgs.

Furcoiu, Aurelian Ioan; Non-Final Office Action for U.S. Appl. No. 16/121,132, filed Sep. 4, 2018, dated Nov. 12, 2019, 31 pgs.

Furcoiu, Aurelian Ioan; International Preliminary Report on Patentability for PCT Application No. PCT/US18/23554, filed Mar. 21, 2018, dated Oct. 31, 2019, 8 pgs.

Furcoiu, Aurelian Ioan; Invitation to Pay Additional Fees for PCT/US19/46085, filed Aug. 12, 2019, dated Oct. 9, 2019, 2 pgs.

Furcoiu, Aurelian Ioan; International Search Report and Written Opinion for PCT Application No. PCT/US19/45453, filed Aug. 7, 2019, dated Oct. 28, 2019, 9 pgs.

Furcoiu, Aurelian Ioan; Supplemental Notice of Allowance for U.S. Appl. No. 15/490,926, filed Apr. 19, 2017, dated Mar. 12, 2020, 9 pgs.

Furcoiu, Aurelian Ioan; Non-Final Office Action for U.S. Appl. No. 15/966,796, filed Apr. 20, 2018, dated Feb. 24, 2020, 40 pgs.

Furcoiu, Aurelian Ioan; Final Office Action for U.S. Appl. No. 16/121,132, filed Sep. 4, 2018, dated Apr. 20, 2020, 17 pgs.

Furcoiu, Aurelian Ioan; International Search Report and Written Opinion for PCT Application No. PCT/US19/65201, filed Dec. 9, 2019, dated Feb. 24, 2020, 10 pgs.

Furcoiu, Aurelian Ioan; Notice of Allowance for U.S. Appl. No. 15/649,022, filed Jul. 13, 2017, dated Oct. 1, 2020, 16 pgs.

Furcoiu, Aurelian Ioan; Non-Final Office Action for U.S. Appl. No. 15/966,796, filed Apr. 30, 2018, dated Sep. 3, 2020, 19 pgs.

Furcoiu, Aurelian Ioan; Corrected Notice of Allowance for U.S. Appl. No. 16/121,132, filed Sep. 4, 2018, dated Aug. 12, 2020, 8 pgs.

Furcoiu, Aurelian Ioan; Supplemental Notice of Allowance for U.S. Appl. No. 15/490,926, filed Apr. 19, 2017, dated May 14, 2020, 7 pgs.

Furcoiu, Aurelian Ioan; Non-Final Office Action for U.S. Appl. No. 15/882,512, filed Jan. 29, 2018, dated Jun. 26, 2020, 20 pgs.

Furcoiu, Aurelian Ioan; Non-Final Office Action for U.S. Appl. No. 15/649,022, filed Jul. 13, 2017, dated Jun. 25, 2020, 55 pgs.

Furcoiu, Aurelian Ioan; Requirement for Restriction/Election for U.S. Appl. No. 15/649,022, filed Jul. 13, 2017, dated May 19, 2020, 6 pgs.

Furcoiu, Aurelian Ioan; Non-Final Office Action for U.S. Appl. No. 15/908,096, filed Feb. 28, 2018, dated Jun. 18, 2020, 54 pgs.

Furcoiu, Aurelian Ioan; Notice of Allowance for U.S. Appl. No. 16/121,132, filed Sep. 4, 2018, dated Jun. 12, 2020, 9 pgs.

Furcoiu, Aurelian Ioan; Notice of Allowance for U.S. Appl. No. 15/490,926, filed Apr. 19, 2017, dated Feb. 12, 2020, 15 pgs.

Furcoiu, Aurelian Ioan; Non-Final Office Action for U.S. Appl. No. 15/882,512, filed Jan. 29, 2018, dated Dec. 12, 2019, 42 pgs.

Furcoiu, Aurelian Ioan; International Search Report and Written Opinion for PCT Application No. PCT/US19/46085, filed Aug. 12, 2019, dated Dec. 11, 2019, 13 pgs.

Mitchell, Timothy J.; International Search Report and Written Opinion for PCT Application No. PCT/US19/65337, filed Dec. 10, 2019, dated Feb. 5, 2020, 9 pgs.

Furcoiu, Aurelian Ioan; Requirement for Restriction/Election for U.S. Appl. No. 15/490,926, filed Apr. 19, 2017, dated Jul. 1, 2019, 9 pgs.

Furcoiu, Aurelian Ioan; Requirement for Restriction/Election for U.S. Appl. No. 15/882,512, filed Jan. 29, 2018, dated Jul. 25, 2019, 8 pgs.

Furcoiu, Aurelian Ioan; International Search Report and Written Opinion for PCT Application No. PCT/US19/28339, filed Apr. 19, 2019, dated Jun. 26, 2019, 8 pgs.

Furcoiu, Aurelian Ioan; Final Office Action for U.S. Appl. No. 15/882,512, filed Jan. 29, 2018, dated Jan. 28, 2021, 20 pgs.

Furcoiu, Aurelian Ioan; Non-Final Office Action for U.S. Appl. No. 16/242,059, filed Jan. 8, 2019, dated Nov. 20, 2020, 52 pgs.

Furcoiu, Aurelian Ioan; Corrected Notice of Allowance for U.S. Appl. No. 15/649,022, filed Jul. 13, 2017, dated Jan. 1, 2021, 8 pgs.

Furcoiu, Aurelian Ioan; Corrected Notice of Allowance for U.S. Appl. No. 15/649,022, filed Jul. 13, 2017, dated Nov. 12, 2020, 7 pgs.

Furcoiu, Aurelian Ioan; Corrected Notice of Allowance for U.S. Appl. No. 15/649,022, filed Jul. 13, 2017, dated Nov. 16, 2020, 9 pgs.

Furcoiu, Aurelian Ioan; Notice of Allowance for U.S. Appl. No. 15/649,022, filed Jul. 13, 2017, dated Dec. 9, 2020, 9 pgs.

Furcoiu, Aurelian Ioan; Non-Final Office Action for U.S. Appl. No. 15/908,096, filed Feb. 28, 2018, dated Dec. 15, 2020, 23 pgs.

Furcoiu, Aurelian Ioan; Office Action for European patent application No. 18787054.8, filed Mar. 21, 2018, dated Dec. 22, 2020, 3 pgs.

Furcoiu, Aurelian Ioan; Office Action for Chinese patent application No. 201880026432.6, file Mar. 21, 2018, dated Nov. 4, 2020, 13 pgs.

Furcoiu, Aurelian Ioan; International Preliminary Report on Patentability for PCT Application No. PCT/US19/28339, filed Apr. 19, 2019, dated Nov. 12, 2020, 7 pgs.

(56) References Cited

OTHER PUBLICATIONS

Furcoiu, Aurelian Ioan; Corrected Notice of Allowance for U.S. Appl. No. 15/649,022, filed Jul. 13, 2017, dated Feb. 3, 2021, 7 pgs.

Furcoiu, Aurelian Ioan; Non-Final Office Action for U.S. Appl. No. 16/575,013, filed Sep. 18, 2019, dated Mar. 10, 2021, 55 pgs.

Furcoiu, Aurelian Ioan; Notice of Allowance for U.S. Appl. No. 15/966,796, filed Apr. 30, 2018, dated Mar. 26, 2021, 26 pgs.

Furcoiu, Aurelian Ioan; Non-Final Office Action for U.S. Appl. No. 16/266,835, filed Feb. 4, 2019, dated Mar. 24, 2021, 62 pgs.

Furcoiu, Aurelian Ioan; Requirement for Restriction/Election for U.S. Appl. No. 16/266,835, filed Feb. 4, 2019, dated Feb. 22, 2021, 6 pgs.

Furcoiu, Aurelian Ioan; International Preliminary Report on Patentability for PCT Application No. PCT/US19/46085, filed Aug. 12, 2019, dated Mar. 18, 2021, 10 pgs.

Furcoiu, Aurelian Ioan; International Preliminary Report on Patentability for PCT Application No. PCT/US19/45453, filed Aug. 7, 2019, dated Mar. 4, 2021, 8 pgs.

Furcoiu, Aurelian Ioan; Notice of Allowance for U.S. Appl. No. 15/882,512, filed Jan. 29, 2018, dated May 24, 2021, 23 pgs.

Furcoiu, Aurelian Ioan; Final Office Action for U.S. Appl. No. 16/575,013, filed Sep. 18, 2019, dated Jun. 17, 2021, 15 pgs.

Furcoiu, Aurelian Ioan; Final Office Action for U.S. Appl. No. 16/242,059, filed Jan. 8, 2019, dated Jun. 11, 2021, 24 pgs.

Furcoiu, Aurelian Ioan; Final Office Action for U.S. Appl. No. 15/908,096, filed Feb. 28, 2018, dated May 26, 2021, 22 pgs.

Furcoiu, Aurelian Ioan; Supplemental Notice of Allowance for U.S. Appl. No. 15/966,796, filed Apr. 30, 2018, dated May 19, 2021, 6 pgs.

Furcoiu, Aurelian Ioan; Supplemental Notice of Allowance for U.S. Appl. No. 15/966,796, filed Apr. 30, 2018, dated Aug. 3, 2021, 7 pgs.

Furcoiu, Aurelian Ioan; Notice of Allowance for U.S. Appl. No. 16/266,835, filed Feb. 4, 2019, dated Jul. 2, 2021, 11 pgs.

Furcoiu, Aurelian Ioan; International Preliminary Report on Patentability for PCT Application No. PCT/US19/65201, filed Dec. 9, 2019, dated Jul. 22, 2021, 9 pgs.

Furcoiu, Aurelian Ioan; Office Action for Chinese patent application No. 201880026432.6, file Mar. 21, 2018, dated May 28, 2021, 18 pgs.

Furcoiu, Aurelian Ioan; Non-Final Office Action for U.S. Appl. No. 16/854,369, filed Apr. 21, 2020, dated Sep. 22, 2021, 51 pgs.

Furcoiu, Aurelian Ioan; Supplemental Notice of Allowance for U.S. Appl. No. 15/882,512, filed Jan. 29, 2018, dated Sep. 1, 2021, 11 pgs.

Furcoiu, Aurelian Ioan; Notice of Allowance for U.S. Appl. No. 16/242,059, filed Jan. 8, 2019, dated Aug. 13, 2021, 18 pgs.

Furcoiu, Aurelian Ioan; Supplemental Notice of Allowance for U.S Appl. No. 16/242,059, filed Jan. 8, 2019, dated Sep. 1, 2021, 7 pgs.

Furcoiu, Aurelian Ioan; Notice of Allowance for U.S. Appl. No. 15/908,096, filed Feb. 28, 2018, dated Aug. 16, 2021, 12 pgs.

Furcoiu, Aurelian Ioan; Non-Final Office Action for U.S. Appl. No. 16/942,996, filed Jul. 30, 2020, dated Sep. 29, 2021, 44 pgs.

Furcoiu, Aurelian Ioan; Supplemental Notice of Allowance for U.S. Appl. No. 16/266,835, filed Feb. 4, 2019, dated Oct. 6, 2021, 7 pgs.

Furcoiu, Aurelian Ioan; Supplemental Notice of Allowance for U.S. Appl. No. 16/266,835, filed Feb. 4, 2019, dated Aug. 17, 2021, 7 pgs.

Furcoiu, Aurelian Ioan; Extended European Search Report for patent application No. 18787054.8, filed Mar. 21, 2018, dated Mar. 17, 2021, 9 pgs.

Furcoiu, Aurelian Ioan; Notice of Allowance for U.S. Appl. No. 16/575,013, filed Sep. 18, 2019, dated Nov. 9, 2021, 13 pgs.

Furcoiu, Aurelian Ioan; Corrected Notice of Allowance for U.S. Appl. No. 15/908,096, filed Feb. 28, 2018, dated Nov. 1, 2021, 8 pgs.

Furcoiu, Aurelian Ioan; Corrected Notice of Allowance for U.S. Appl. No. 15/908,096, filed Feb. 28, 2018, dated Nov. 10, 2021, 7 pgs.

Furcoiu, Aurelian Ioan; Supplemental Notice of Allowance for U.S. Appl. No. 15/966,796, filed Apr. 30, 2018, dated Nov. 10, 2021, 6 pgs.

Mitchell, Timothy; Non-Final Office Action for U.S. Appl. No. 16/517,129, filed Jul. 19, 2019, dated Dec. 1, 2021, 71 pgs.

Furcoiu, Aurelian Ioan; Office Action for Chinese patent application No. 201880026432.6, file Mar. 21, 2018, dated Nov. 10, 2021, 18 pgs.

Furcoiu, Aurelian Ioan; Extended European Search Report for application No. 19796735.9, filed Apr. 19, 2019, dated Jan. 4, 2022, 10 pgs.

Furcoiu, Aurelian Ioan; Non-Final Office Action for U.S. Appl. No. 16/386,627, filed Apr. 17, 2019, dated Nov. 17, 2021, 24 pgs.

Furcoiu, Aurelian Ioan; Restriction Requirement for U.S. Appl. No. 16/386,627, filed Apr. 17, 2019, dated Mar. 16, 2021, 5 pgs.

Mueller Co; Brochure for the AquaGrip System, revised Mar. 2018, 4 pgs.

The Ford Meter Box Company, Inc.; Product Announcement for the Ford Uni-Ring, published Jun. 2018, 1 pg.

The Ford Meter Box Company, Inc.; Specification Sheet for MJ Gripping Style Restraint—(FUR-C-x-l style), published Feb. 7, 2019, 1 pg.

The Ford Meter Box Company, Inc.; Specification Sheet for MJ Gripping Style Restraint—(FUR-C-x-RB-l style), published Feb. 6, 2019, 1 pg.

Furcoiu, Aurelian Ioan; Notice of Allowance for U.S. Appl. No. 16/854,369, filed Apr. 21, 2020, dated Mar. 10, 2022, 14 pgs.

Furcoiu, Aurelian Ioan; Non-Final Office Action for U.S. Appl. No. 16/854,384, filed Apr. 21, 2020, dated Apr. 14, 2022, 59 pgs.

Furcoiu, Aurelian Ioan; Notice of Allowance for U.S. Appl. No. 16/942,996, filed Jul. 30, 2020, dated Feb. 23, 2022, 15 pgs.

Mitchell, Timothy J.; Notice of Allowance for U.S. Appl. No. 16/517,129, filed Jul. 19, 2019, dated Apr. 12, 2022, 13 pgs.

Mitchell, Timothy J.; International Preliminary Report on Patentability for PCT Application No. PCT/US19/65337, filed Dec. 10, 2019, dated Feb. 3, 2022, 8 pgs.

Furcoiu, Aurelian Ioan; Applicant-Initiated Interview Summary for U.S. Appl. No. 16/386,627, filed Apr. 17, 2019, dated Feb. 7, 2022, 2 pgs.

Furcoiu, Aurelian Ioan; Final Office Action for U.S. Appl. No. 16/386,627, filed Apr. 17, 2019, dated Jun. 16, 2022, 22 pgs.

Furcoiu, Aurelian Ioan; Notice of Allowance for U.S. Appl. No. 16/854,384, filed Apr. 21, 2020, dated Jul. 21, 2022, 9 pgs.

\* cited by examiner

JOINT RESTRAINT DEVICE

TECHNICAL FIELD

This disclosure relates to pipe connections. More specifically, this disclosure relates to a gasket for a mechanical joint pipe connection.

BACKGROUND

Mechanical joint pipe connections are a common method for attaching a pipe length to a piping element such as a valve, a coupling, or a fitting, such as a tee or elbow, or another pipe length. The mechanical joint pipe connection can comprise a female socket, a gland, a gasket, and a pipe length. The piping element commonly defines the female socket, which is configured to receive a pipe end of the pipe length and a gasket. A gland is commonly provided and can slip over the pipe end of the pipe length. The gland can then be tightened to the piping element by a series of fasteners which draw the gland towards the female socket, thereby compressing the gasket. Compression of the gasket causes the gasket to engage an outer pipe surface of the pipe length, thereby forming a seal between the pipe length and the element.

Mechanical joint pipe connections are popular because mechanical joint pipe connections function with the plain end of the pipe length, unlike groove connections or flanged connections that require preparation of the plain end of the pipe length. The ability to function with the plain end allows for the pipe length to be cut to size in a field installation without requiring the time and field equipment necessary to weld a flange to the plain end or to cut or roll a new groove in the plain end. Mechanical joint pipe connections can be assembled quickly with common hand tools such as a wrench or ratchet.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a gland assembly comprising a gland defining an annular ring, the annular ring defining a first gland end and a second gland end disposed opposite from the first gland end; and a gasket, the gasket defining a first gasket end and a second gasket end, the first gasket end disposed opposite from the second gasket end, a gasket bore extending through the gasket from the first gasket end to the second gasket end, a gland collar defined at the first gasket end, the gasket bore receiving the second gland end of the annular ring.

Also disclosed is a piping element assembly comprising a piping element defining a female socket; a gland assembly comprising a gasket and a gland, the gasket defining a first gasket end and a second gasket end, the gasket defining a gasket bore extending through the gasket from the first gasket end to the second gasket end, the first gasket end secured to the gland, the second gasket end defining a stop lip extending into the gasket bore, the second gasket end inserted into the female socket; and a pipe length, the pipe length defining a pipe end, the pipe end inserted into the gasket bore, the pipe end seated against the stop lip.

Also disclosed is a method for forming a mechanical joint connection, the method comprising inserting a pipe end of a pipe length into a gland bore of a gland; inserting the pipe end of the pipe length into a gasket bore of a gasket; seating the pipe end against a stop lip of the gasket; inserting a portion of the gasket into a female socket of a piping element; inserting the pipe end into the female socket of the piping element; and securing the gland to a flange of the piping element.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a gland assembly and associated methods, systems, devices, and various apparatus. The gland assembly comprises a gasket and a gland. It would be understood by one of skill in the art that the disclosed gland assembly is described in but a few exemplary aspects among many. No particular terminology or description should be considered limiting on the disclosure or the scope of any claims issuing therefrom.

Figure 1:
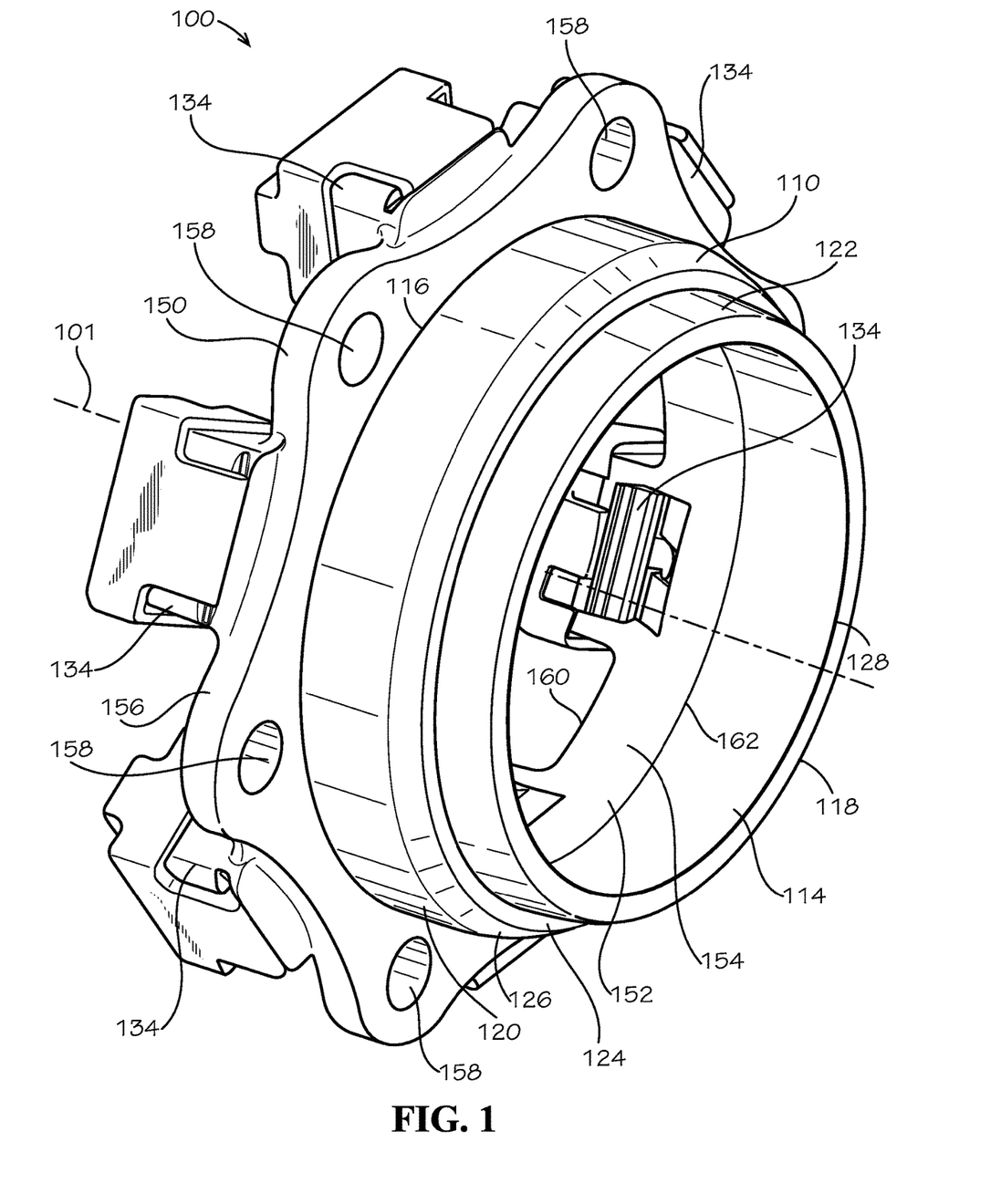
FIG. 1 is a perspective front view of a gland assembly comprising a gland and a gasket in accordance with one aspect of the disclosure.

FIG. 1 is a perspective front view of a gland assembly 100 in accordance with one aspect of the present disclosure. The gland assembly 100 can comprise a gasket 110 and a gland 150. The gasket 110 can define an annular shape with a gasket bore 114 extending through the gasket 110 from a first gasket end 116 of the gasket 110 to a second gasket end 118 of the gasket 110. The gasket bore 114 can define an axis 101 extending from the first gasket end 116 to the second gasket end 118. The gasket 110 can define a reduced shoulder 124 disposed between the first gasket end 116 and the second gasket end 118 of the gasket 110. The gasket 110 can define a stop lip 128 at the second gasket end 118 of the gasket 110, and the stop lip 128 can extend radially inward into the gasket bore 114 relative to the axis 101.

A gland collar 120 of the gasket 110 can be defined between the first gasket end 116 and the reduced shoulder 124, and a pipe collar 122 of the gasket 110 can be defined between the reduced shoulder 124 and the second gasket end 118. In the present aspect, the reduced shoulder 124 can extend radially inward to the pipe collar 122. In the present aspect, the gasket 110 can also define a chamfered edge 126 extending radially and axially inward from the gland collar 120 towards the reduced shoulder 124. The chamfered edge 126 and the reduced shoulder 124 can each be defined by a sealing band 810 (shown in FIG. 8) of the gasket 110, which can be positioned between the gland collar 120 and the pipe collar 122.

The gland 150 can define an annular ring 152 and a flange portion 156. The gland 150 can comprise a plurality of joint restraint assemblies 134 positioned around the flange portion 156 of the gland 150. The joint restraint assemblies 134 can be similar to joint restraint assemblies described in U.S. patent application Ser. No. 15/490,926, filed Apr. 19, 2017, U.S. patent application Ser. No. 15/882,512, filed Jan. 29, 2018, and U.S. patent application Ser. No. 15/966,796, filed Apr. 30, 2018, each of which is hereby incorporated by reference herein in its entirety.

The flange portion 156 of the gland 150 can define a plurality of fastener holes 158 extending through the flange portion 156. In the present aspect, each of the fastener holes 158 can be positioned between a different pair of joint restraint assemblies 134. The annular ring 152 can define a gland bore 154 extending through the gland 150 from a first gland end 160 of the annular ring 152 to a second gland end 162 of the annular ring 152. The gland bore 154 can be coaxial to the axis 101 of the gasket bore 114. In the present aspect, the flange portion 156 can extend radially outward, relative to the axis 101, from the annular ring 152 proximate to the first gland end 160 of the annular ring 152.

The gland collar 120 of the gasket 110 can be sized to receive the annular ring 152 of the gland 150, and in the present aspect, the first gasket end 116 of the gasket 110 can be positioned in facing engagement with the flange portion 156 of the gland 150. The gasket 110 can comprise an elastic and resilient material, such as an elastomer, polymer, or rubber for example and without limitation. In the present aspect, the gasket 110 can be stretched over the annular ring 152 such that the gasket 110 can be retained on the annular ring 152. In other aspects, the gasket 110 may not stretch over the annular ring 152, and the gasket 110 can fit over the annular ring 152 in a relaxed state. In some aspects, the gasket 110 can be secured on the annular ring 152, such as with a glue, adhesive, mastic, epoxy, tape, or other fastening mechanism, such as a mechanical fastener for example and without limitations. With the gasket 110 retained on the annular ring 152 of the gland 150, the gland assembly 100 can be handled as a single unit which can aid in the assembly of a mechanical joint as further described below. In some aspects, the gasket 110 may not comprise the gland collar 120, and in some aspects, the gasket 110 may not be secured to the gland 150. In some aspects, the gasket 110 may not comprise the pipe collar 122. In some aspects, the gasket 110 may not define the stop lip 128.

Figure 2:
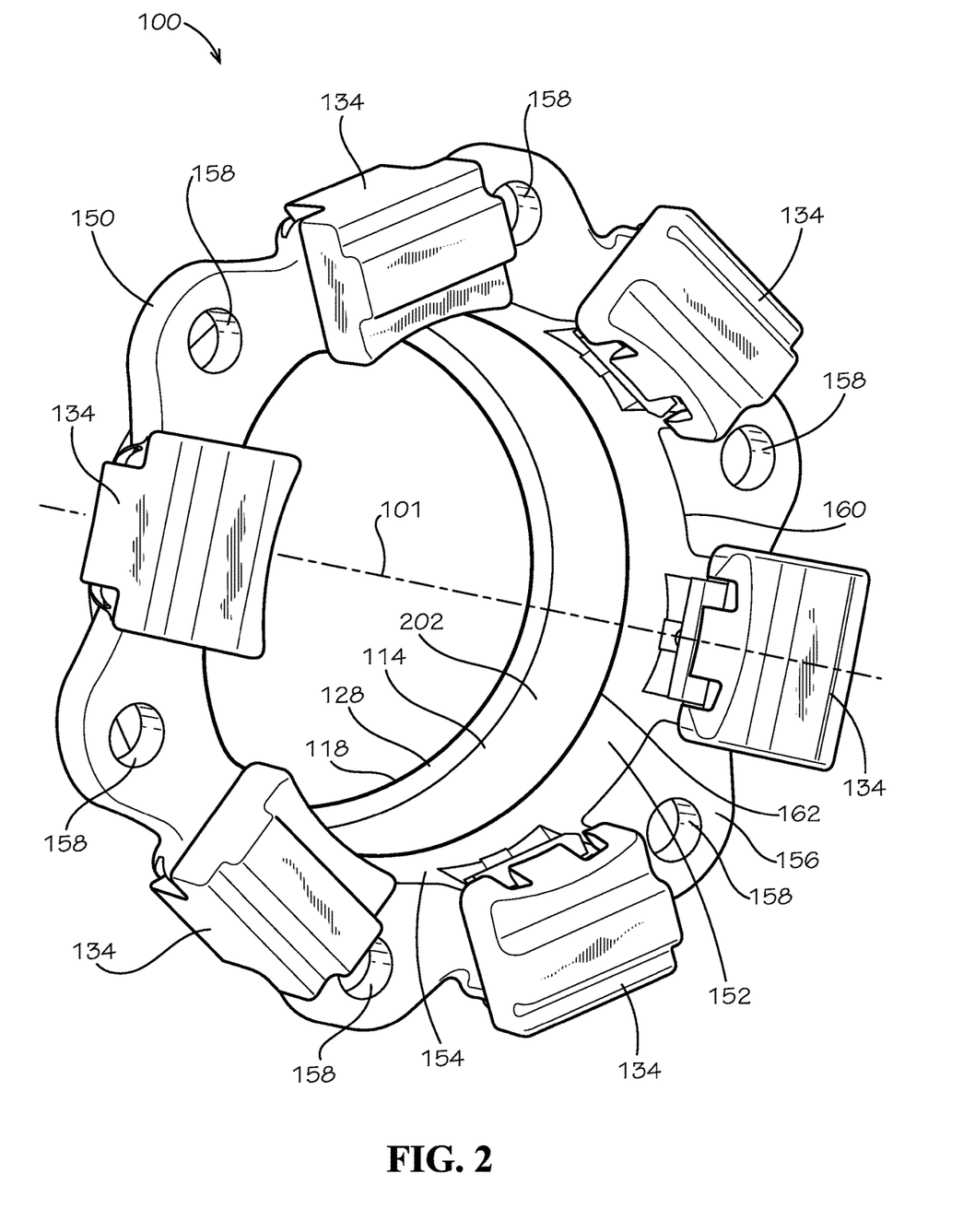
FIG. 2 is a perspective rear view of the gland assembly of FIG. 1 facing a first gland end of an annular ring of the gland and a flange portion of the gland.

FIG. 2 is a perspective rear view of the gland assembly 100 of FIG. 1 facing the first gland end 160 of the annular ring 152 and the flange portion 156 of the gland 150. The gland bore 154 and the gasket bore 114 can align to define a gland assembly bore 202 of the gland assembly 100.

Figure 3:
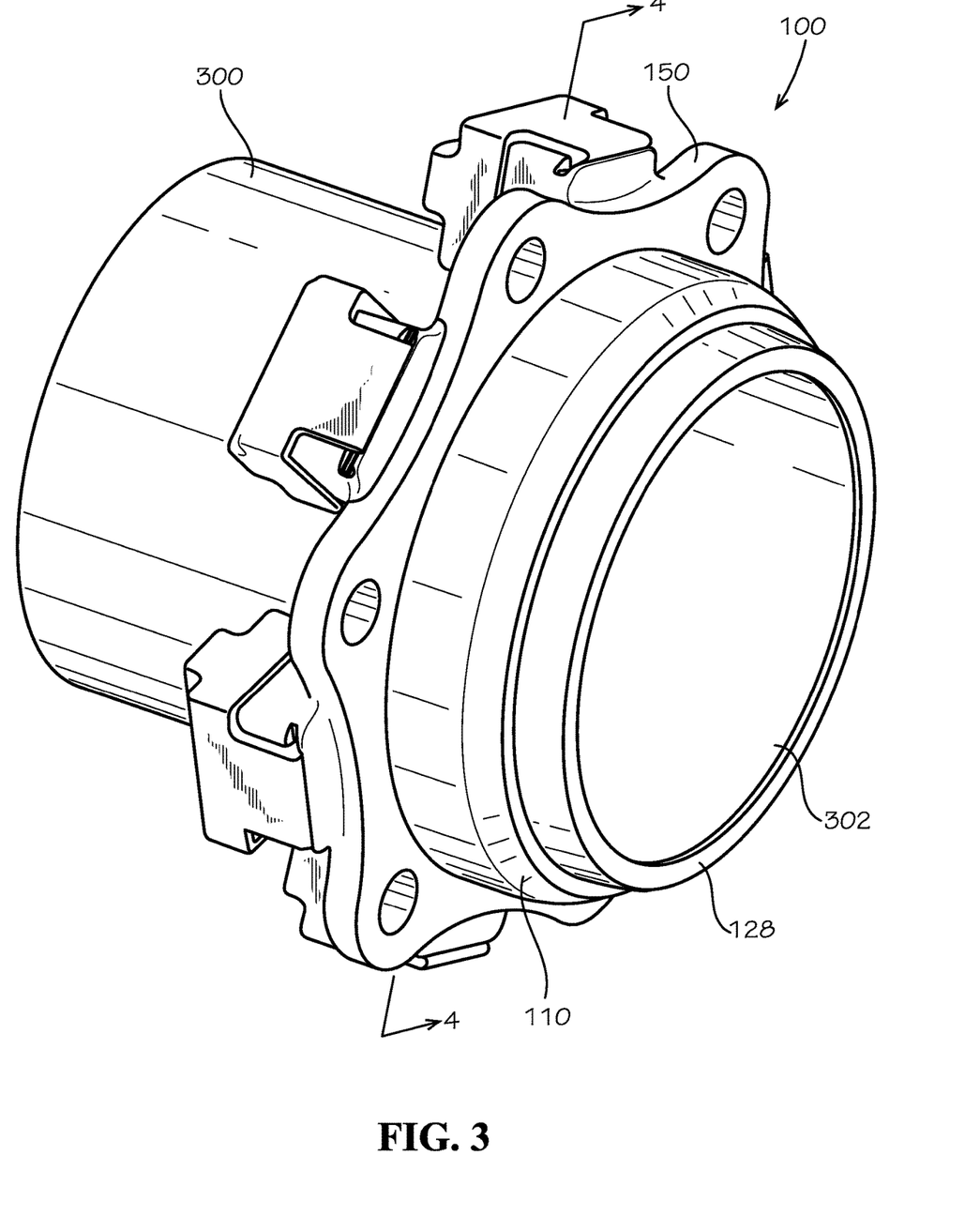
FIG. 3 is a perspective front view of the gland assembly of FIG. 1 with a pipe end of a pipe length inserted into a gland assembly bore of the gland assembly.
Figure 4:
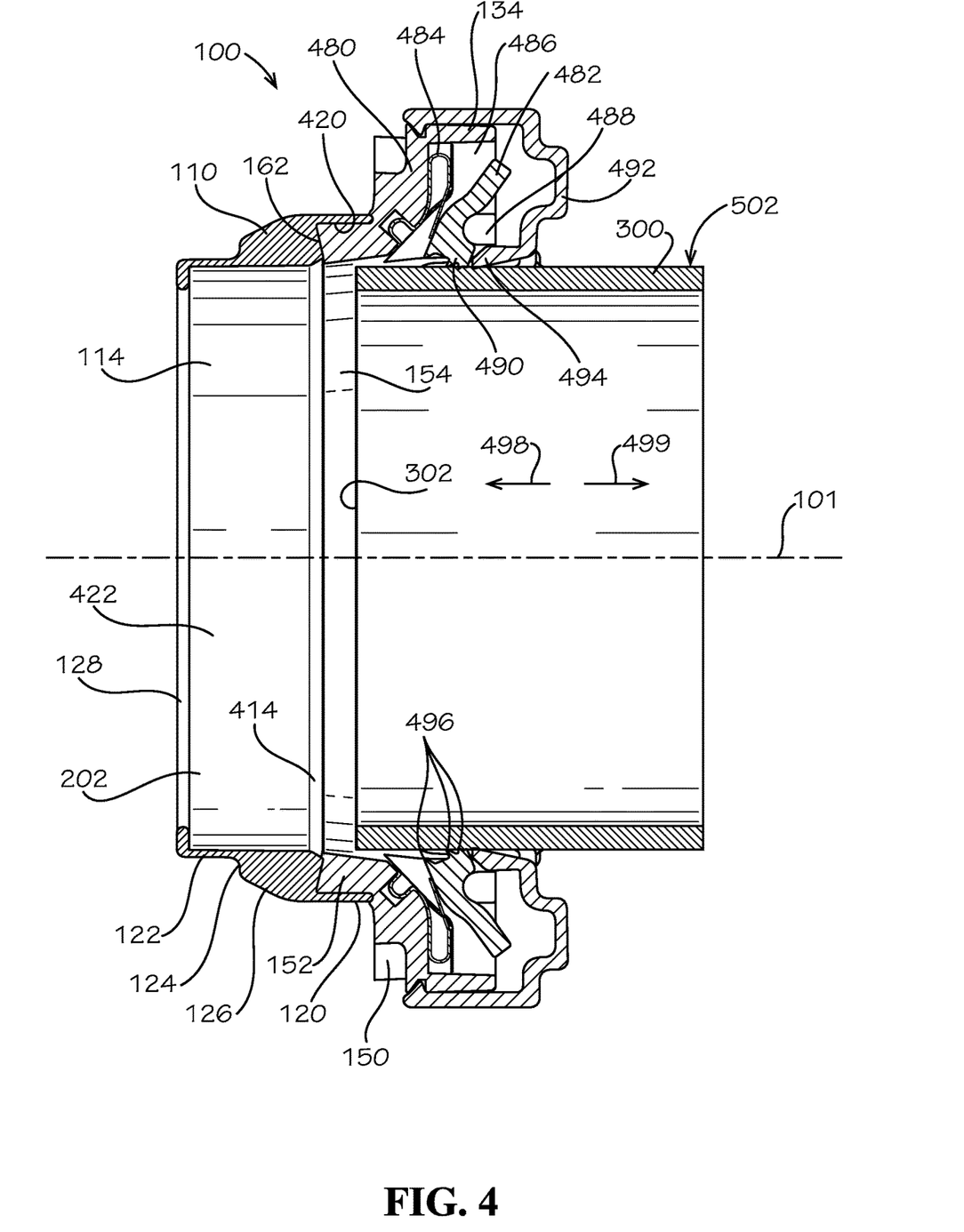
FIG. 4 is a cross-sectional side view of the gland assembly of FIG. 1 and the pipe length of FIG. 3 taken along line 4-4 shown in FIG. 3 with the pipe end partially inserted into the gland assembly bore.
Figure 5:
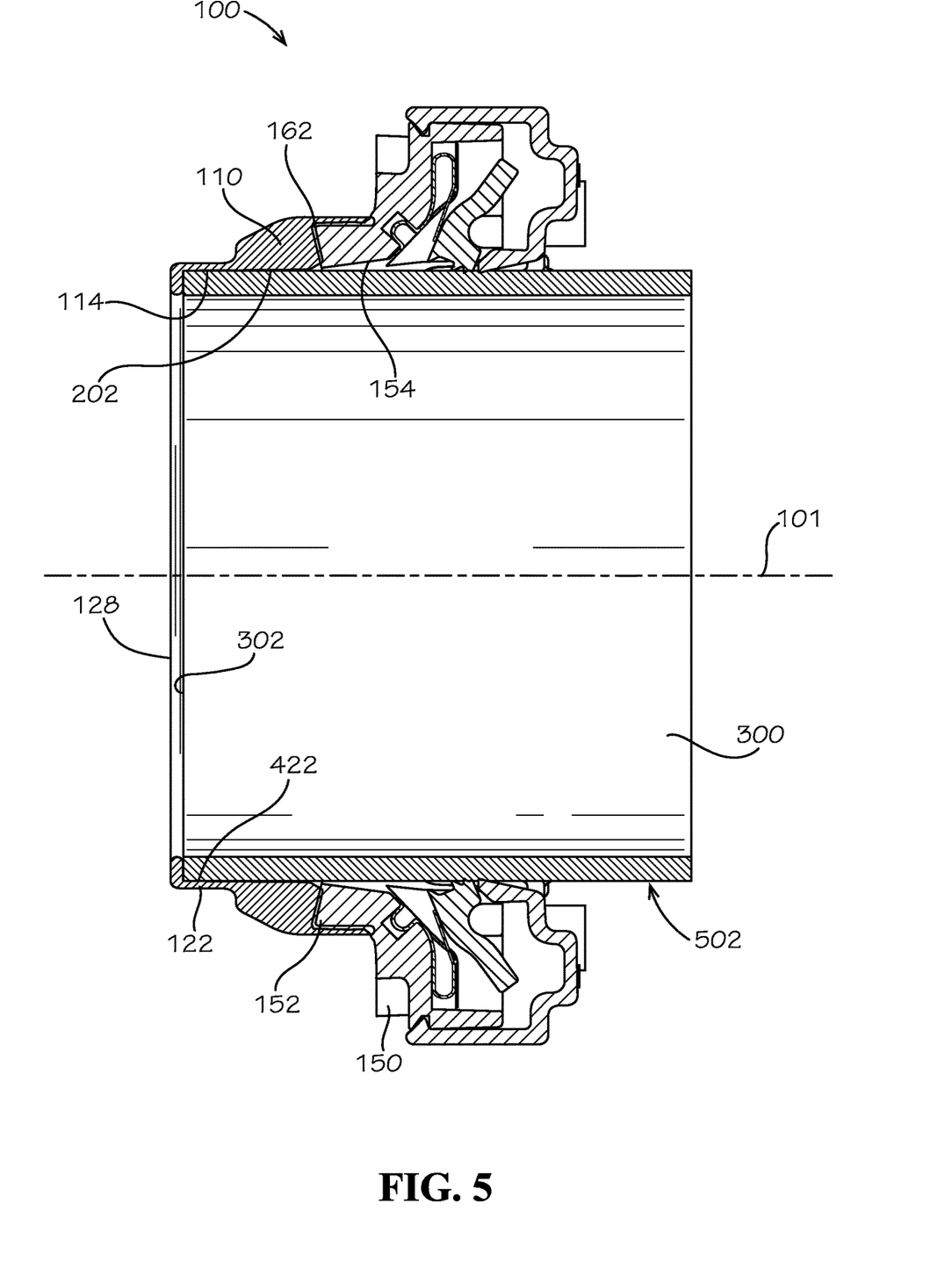
FIG. 5 is a cross-sectional side view of the gland assembly of FIG. 1 and the pipe length of FIG. 3 taken along line 4-4 shown in FIG. 3 with the pipe end fully inserted into the gland assembly bore.

FIG. 3 is a perspective front view of the gland assembly 100 of FIG. 1 with a pipe end 302 of a pipe length 300 inserted into the gland assembly bore 202 (shown in FIGS. 4-5) from the first gland end 160 (shown in FIG. 2) of the annular ring 152 (shown in FIGS. 4-5). The pipe length 300 can be inserted until the pipe end 302 contacts the stop lip 128.

FIGS. 4 and 5 are cross-sectional side views of the gland assembly 100 of FIG. 1 and the pipe length 300 of FIG. 3 taken along line 4-4 shown in FIG. 3. FIGS. 4 and 5 demonstrate the process of inserting the pipe end 302 into the gland assembly bore 202. In FIG. 4, the pipe end 302 is positioned within the gland bore 154 and is only partially inserted into the gland assembly bore 202. The pipe end 302 has not yet entered the gasket bore 114 or contacted the stop lip 128. As shown, the gland bore 154 can taper radially and axially inwards, with respect to the axis 101, towards the second gland end 162 of the annular ring 152. The taper of the gland bore 154 can guide the pipe end 302 into the gasket bore 114 as the pipe end 302 is axially translated towards the stop lip 128 relative to the axis 101.

The gasket 110 can also define a transition chamfer 414 within the gasket bore 114 which can be positioned adjacent to the second gland end 162 of the annular ring 152. The transition chamfer 414 can further aid in guiding the pipe end 302 into a pipe collar bore portion 422 of the gasket bore 114 defined by the pipe collar 122. The transition chamfer 414 can also prevent the pipe end 302 from catching on the pipe collar bore portion 422 and pulling the second gland end 162 of the annular ring 152 outwards from a gland collar bore portion 420 of the gasket bore 114 defined by the gland collar 120.

Each joint restraint assembly 134 can comprise a restraint base 480, a gripper 482, and a spring clip 484. The joint restraint assembly 134 can be assembled on the restraint base 480. In the present aspect, the restraint base 480 can be integrally defined by the gland 150; however in other aspects, the restraint base 480 can be a separate component which can be attached or fastened to the annular ring 152. The restraint base 480 can define a restraint pocket 486 and a restraint pivot 488. The gripper 482 and the spring clip 484 can be disposed within the restraint pocket 486. The gripper 482 can rotate and/or translate about the restraint pivot 488 such that an engagement end 490 of the gripper 482 can be drawn into and out of contact with an outer pipe surface 502 of the pipe length 300.

The joint restraint assembly 134 can be configured to allow for movement of the pipe length 300 in the insertion direction 498 relative to the gland assembly 100; however, the joint restraint assembly 134 can be configured to limit or prevent movement of the pipe length 300 in the withdrawal direction 499 relative to the gland assembly 100.

The spring clip 484 can bias the engagement end 490 towards engagement with the outer pipe surface 502. In the present aspect, a cover 492 can be positioned over the joint restraint assembly 134, and a stop leg 494 of the cover 492 can prevent the engagement end 490 from fully engaging the outer pipe surface 502 in a final engagement position, wherein each of a plurality of teeth 496 of the engagement end 490 contacts the outer pipe surface 502. In the final engagement position, the pipe length 300 can be prevented from moving in a withdrawal direction 499 relative to the gland assembly 100. Removing the cover 492 and disengaging the stop leg 494 from the engagement end 490 of the gripper 482 can allow the gripper 482 to rotate about the restraint pivot 488 to fully engage the outer pipe surface 502 in the final engagement position.

In FIG. 5, the pipe end 302 can be fully inserted into the gland assembly bore 202 until the pipe end 302 seats against the stop lip 128. The stop lip 128 can interfere with the pipe end 302 to act as a positive stop. The stop lip 128 can limit the insertion of the pipe end 302 into the gland assembly bore 202, thereby ensuring correct positioning of the gland assembly 100 on the pipe length 300 for mating up a mechanical joint pipe connection as described below. As shown, in the present aspect, the pipe collar 122 can demonstrate a close fit with the pipe length 300 proximate to the pipe end 302, and the pipe collar bore portion 422 of the gasket bore 114 can be positioned in facing engagement with an outer pipe surface 502 of the pipe length 300.

As previously described, FIGS. 4-5 can demonstrate the process of inserting the pipe end 302 into the gland assembly bore 202. In practice, the gland assembly 100 can also be slipped over the pipe end 302 of the pipe length 300 rather than inserting the pipe end 302 into the gland assembly bore 202. To do so, the first gland end 160 (shown in FIG. 1) of the gland 150 and the gland bore 154 can be aligned with the pipe end 302, and the gland assembly 100 can be pulled over the pipe end 302 until the pipe end 302 seats against the stop lip 128. In other aspects, the gland assembly 100 can be fastened to a piping element 910 (shown in FIG. 9), and the pipe end 302 can be stabbed into the gland assembly bore 202 with the gasket 110 in the relaxed state, and the stop lip 128 can provide a positive stop to limit insertion of the pipe end 302 into the piping element 910.

Figure 6:
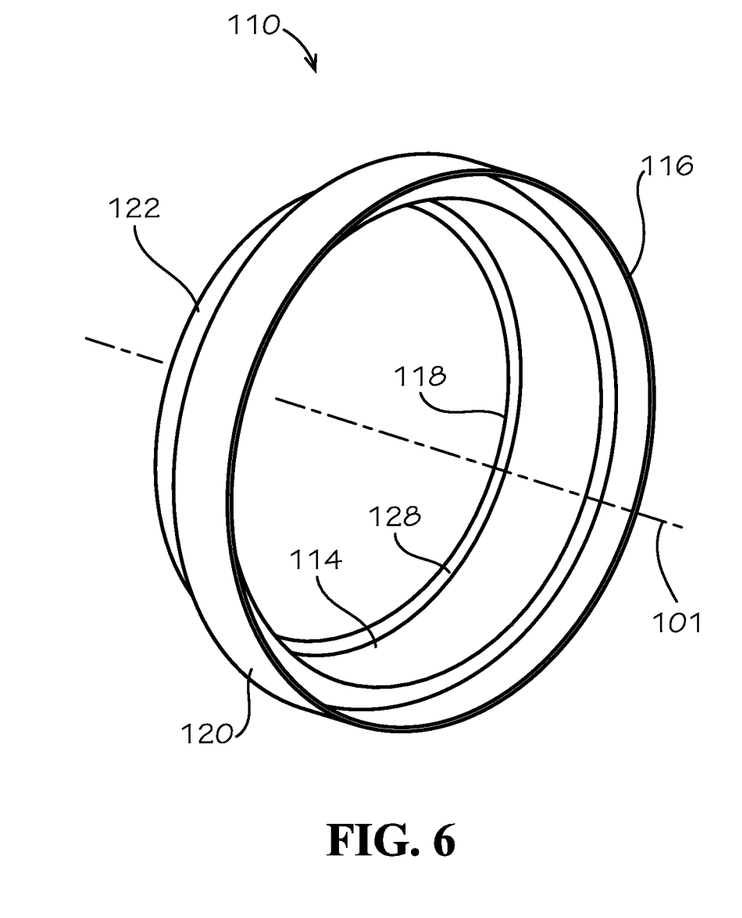
FIG. 6 is a perspective view of the gasket of FIG. 1 facing a first gasket end of the gasket.
Figure 7:
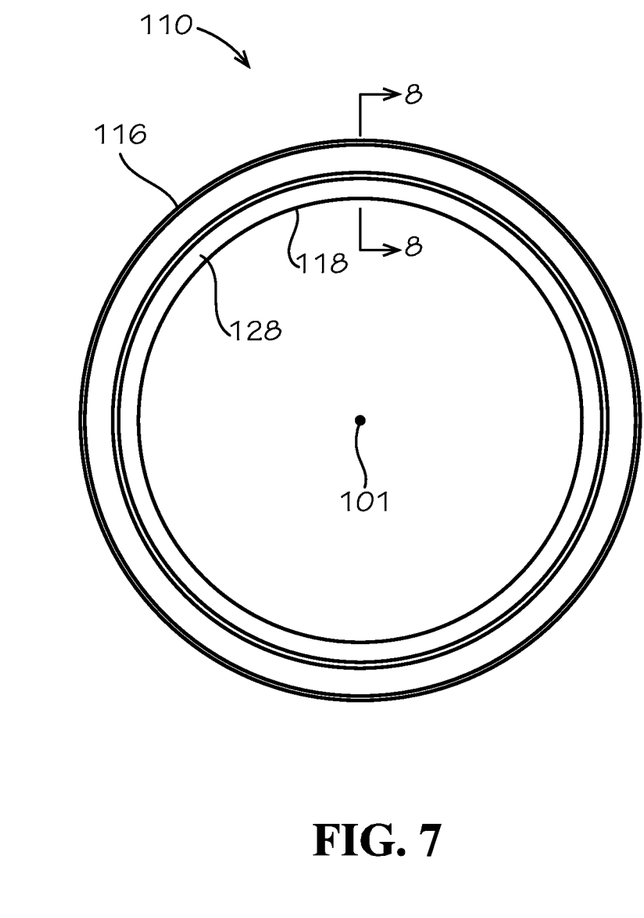
FIG. 7 is an end view of the gasket of FIG. 1 facing the first gasket end.

FIG. 6 is a perspective view of the gasket 110 of FIG. 1 facing the first gasket end 116 of the gasket 110. FIG. 7 is an end view of the gasket 110 of FIG. 1 facing the first gasket end 116 of the gasket 110.

Figure 8:
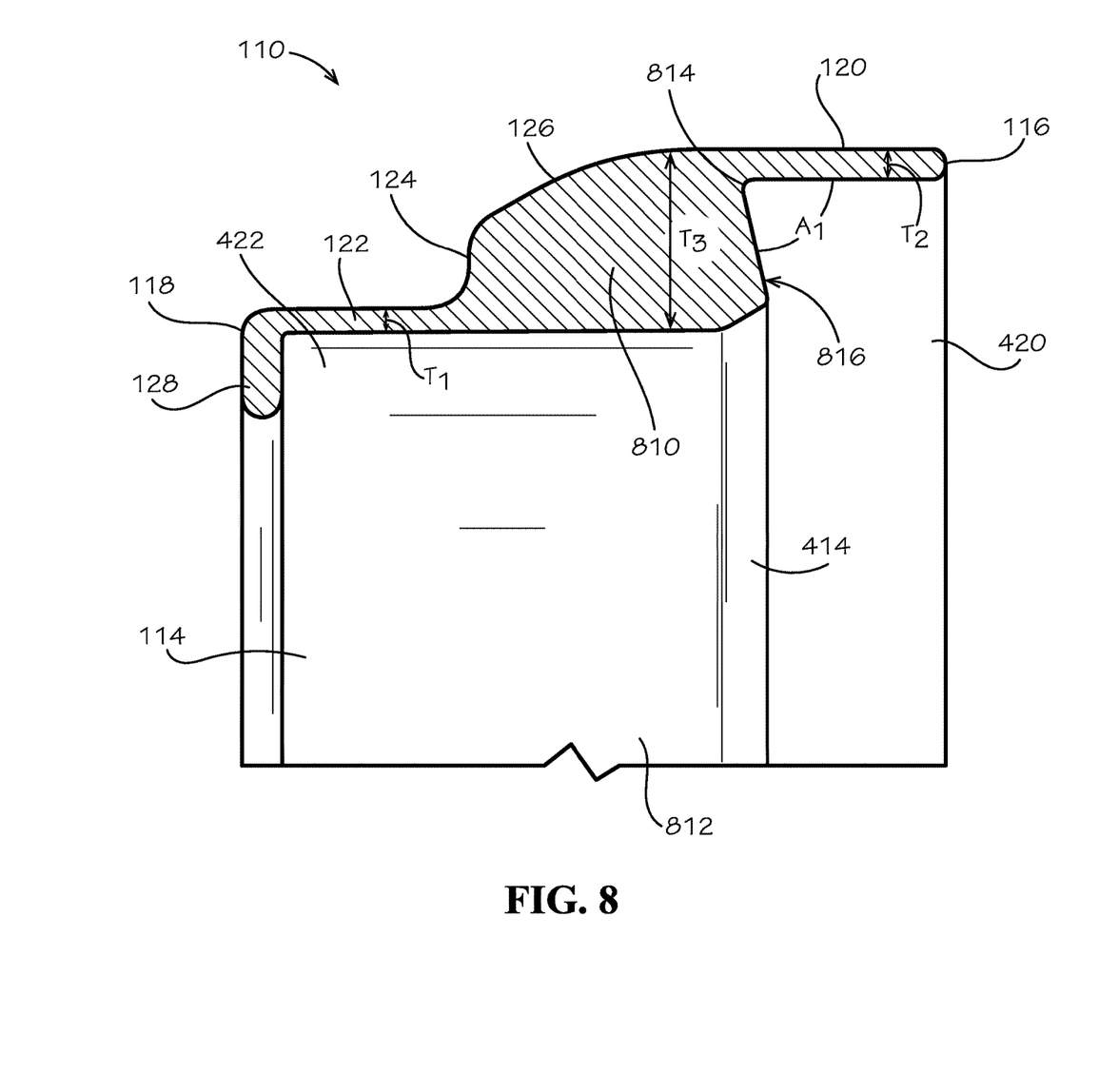
FIG. 8 is a detailed cross-sectional view of the gasket of FIG. 1 taken along line 8-8 shown in FIG. 7.

FIG. 8 is a detailed cross-sectional view of the gasket 110 of FIG. 1 taken along line 8-8 shown in FIG. 7. As shown, the gasket 110 can define the sealing band 810 between the gland collar 120 and the pipe collar 122. The pipe collar 122 can define a pipe collar radial thickness $T_1$. The gland collar 120 can define a gland collar radial thickness $T_2$. The sealing band 810 can define a sealing band radial thickness $T_3$. Each of the radial thicknesses $T_{1-3}$ can be measured in a radial direction relative to the axis 101 (shown in FIG. 7 extending outwards from the page). In the present aspect, the sealing band radial thickness $T_3$ can be greater than the gland collar radial thickness $T_2$ and the pipe collar radial thickness $T_1$. In the present aspect, the gland collar radial thickness $T_2$ can also be greater than the pipe collar radial thickness $T_1$. In other aspects, the pipe collar radial thickness $T_1$ can be greater than the gland collar radial thickness $T_2$.

The sealing band 810 can define the reduced shoulder 124 and the chamfered edge 126 as previously described. The sealing band 810 can define a sealing band bore portion 812 of the gasket bore 114 between the pipe collar bore portion 422 and the transition chamfer 414, which can also be defined by the sealing band 810. In the present aspect, the sealing band bore portion 812 and the pipe collar bore portion 422 can together be substantially cylindrical. In other aspects, the pipe collar bore portion 422 or both the pipe collar bore portion 422 the sealing band bore portion 812 can taper towards the second gasket end 118.

A ring groove 814 can be defined within the gasket bore 114 between the sealing band 810 and the gland collar 120. The ring groove 814 can be configured to receive the second gland end 162 (shown in FIG. 1) of the annular ring 152 (shown in FIG. 1). The sealing band 810 can define an angled surface 816 between the transition chamfer 414 and the gland collar bore portion 420. A groove angle $A_1$ can be defined between the gland collar bore portion 420 of the gland collar 120 and an angled surface 816 of the sealing band 810.

In the present aspect, the groove angle $A_1$ can be an acute angle. As the transition chamfer 414 extends from the sealing band bore portion 812 to the angled surface 816, the transition chamfer 414 can extend radially outward from the sealing band bore portion 812 and axially outward towards the first gasket end 116, relative to the axis 101. As the angled surface 816 extends from the gland collar bore portion 420 to the transition chamfer 414, the angled surface 816 can extend radially inward toward the transition chamfer 414 and axially outward towards the first gasket end 116, relative to the axis 101.

Figure 9:
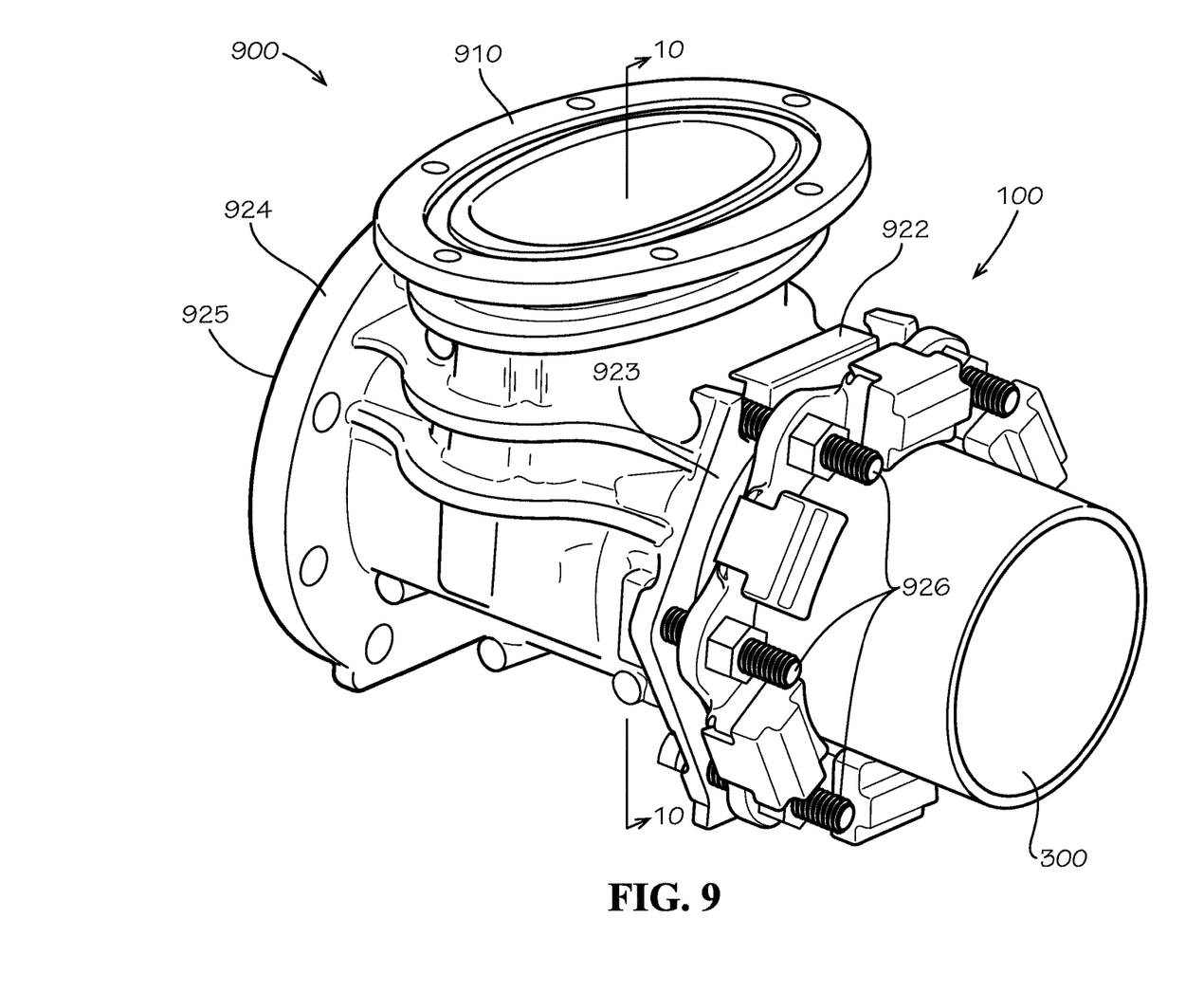
FIG. 9 is a perspective view of a piping element assembly comprising a piping element, the gland assembly of FIG. 1, and the pipe length of FIG. 3 in accordance with another aspect of the present disclosure.

FIG. 9 is a perspective view of a piping element assembly 900 in accordance with another aspect of the present disclosure. The piping element assembly 900 can comprise the piping element 910, the gland assembly 100 of FIG. 1, and the pipe length 300 of FIG. 3. In the present aspect, the piping element 910 can be a valve body, such as for a gate valve; however, in other aspects, the piping element 910 can be a pipe fitting, such as a tee, an elbow, a reducer, a wye, a shaped fitting, or any other suitable type of pipe fitting.

The piping element 910 can define a first element end 923 and a second element end 925 disposed opposite from the first element end 923. The piping element 910 can define a first flange 922 at the first element end 923 and a second flange 924 at the second element end 925. The second flange 924 can be configured to form a flanged connection with another pipe length or piping element by attaching the second flange 924 to another similar flange (not shown). For example, the second flange 924 can be a flat-faced flange, a raised-face flange, a ring-type joint, or any other common flange type used to form a flanged connection.

The first flange 922 can be configured to form a mechanical connection, such as with the pipe length 300. The first flange 922 can be a mechanical joint flange, and the first flange 922 can be secured to the gland 150 by a plurality of fasteners 926. The fasteners 926 can be tightened to draw the gland assembly 100 towards the first flange 922 to form the mechanical connection and a seal between the piping element 910 and the pipe length 300. In other aspects, the second flange 924 can be similar to the first flange 922, and the second flange 924 can be configured to form a mechanical connection, such as with a second pipe length (not shown).

Figure 10:
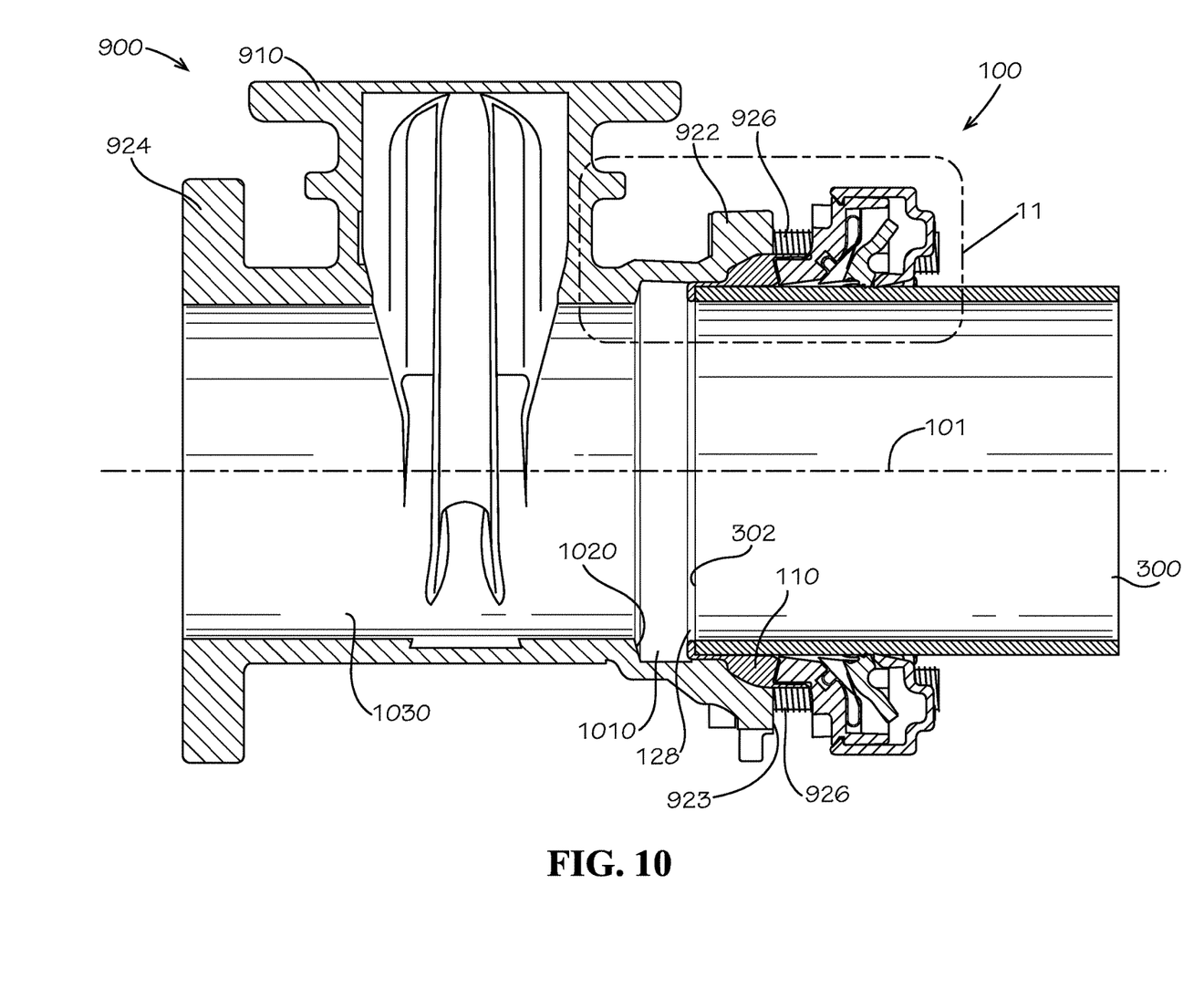
FIG. 10 is a cross-sectional side view of the piping element assembly of FIG. 9 taken along line 10-10 shown in FIG. 9.

FIG. 10 is a cross-sectional side view of the piping element assembly 900 of FIG. 9 taken along line 10-10 shown in FIG. 9. The piping element 910 can define a female socket 1010 extending axially inward from the first element end 923, relative to the axis 101. The piping element 910 can further define an inner element bore 1030 extending from the female socket 1010 to the second flange 924. An element shoulder 1020 can be defined adjacent to the female socket 1010. The element shoulder 1020 can be positioned between the female socket 1010 and the inner element bore 1030. In the present aspect, the element shoulder 1020 can extend radially outward from the inner element bore 1030 toward the female socket 1010 and axially outward towards the first element end 923, relative to the axis 101. With the gland assembly 100 secured to the first flange 922 by the fasteners 926, the pipe end 302 and portions of the gasket 110, including the stop lip 128, can be inserted into the female socket 1010. In the present aspect, the stop lip 128 can be positioned between the pipe end 302 and the element shoulder 1020 to prevent contact between the pipe end 302 and the element shoulder 1020.

Figure 11:
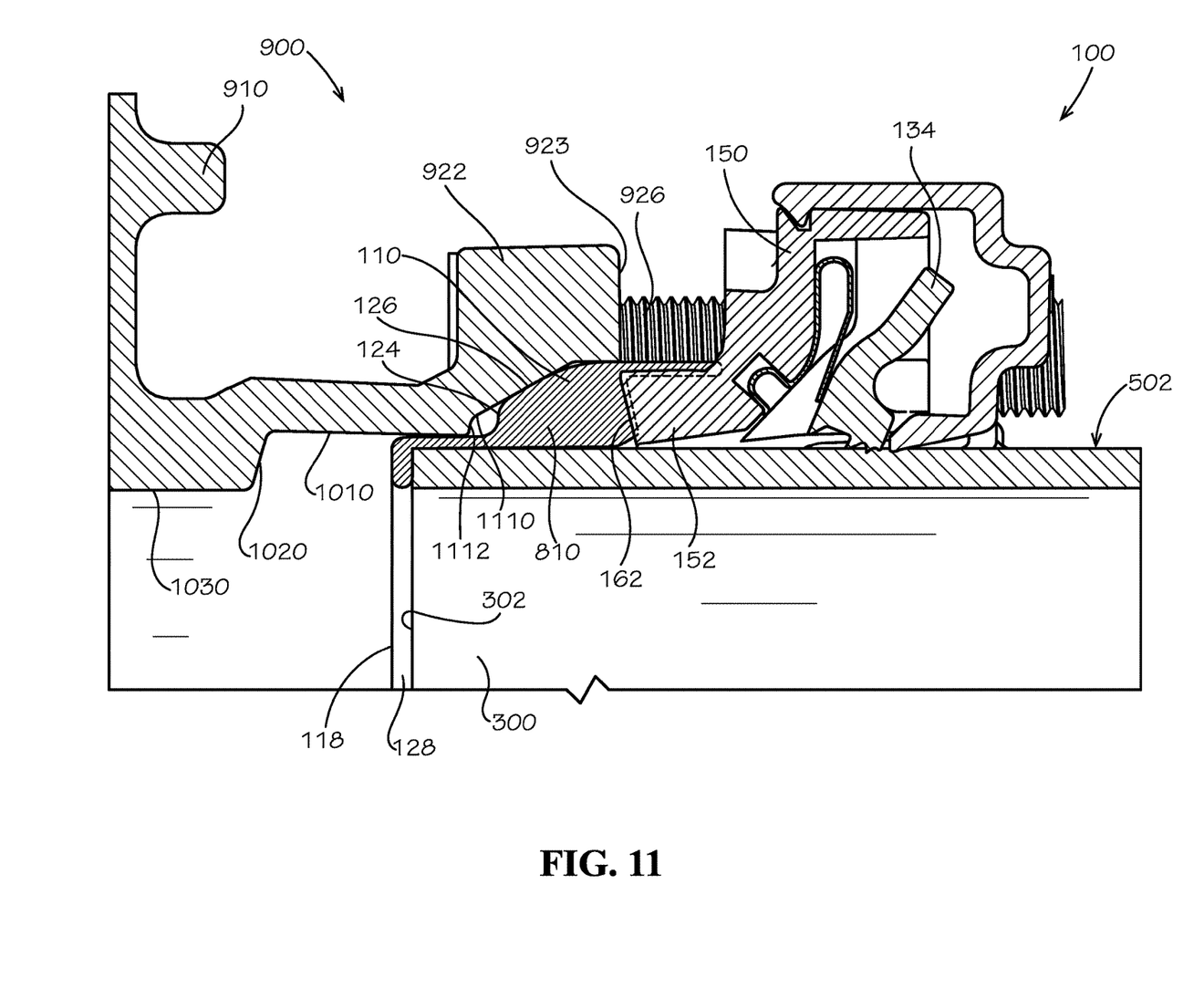
FIG. 11 is a detailed cross-sectional view of the piping element assembly of FIG. 9 taken from Detail 11 shown in FIG. 10.

FIG. 11 is a detailed cross-sectional side view of the piping element assembly 900 of FIG. 9 taken from Detail 11 shown in FIG. 10. The female socket 1010 can define a gasket pocket 1110 which can taper inwards from the first element end 923 into the first flange 922. The second gasket end 118 of the gasket 110 can be inserted into the female socket 1010. The gasket pocket 1110 can be sized and shaped to receive the sealing band 810 of the gasket 110. The tapered gasket pocket 1110 can engage the chamfered edge 126 of the gasket 110. As the fasteners 926 are tightened, the gland assembly 100 can be drawn towards the first flange 922, thereby placing the gasket 110 in a compressed state. In the compressed state, the second gland end 162 of the annular ring 152 can axially compress the sealing band 810 within the gasket pocket 1110, and the tapered shape of the gasket pocket 1110 can press the sealing band 810 radially inwards to form a seal with the outer pipe surface 502 of the pipe length 300, proximate to the pipe end 302. The sealing band 810 can also form a seal with the gasket pocket 1110, thereby sealing the piping element 910 to the pipe length 300 in fluid communication.

The gasket pocket 1110 can further define a pocket shoulder 1112, and in the present aspect, the reduced shoulder 124 may not contact the pocket shoulder 1112. In other aspects, the pocket shoulder 1112 can contact the reduced shoulder 124 when the gasket 110 is in the compressed state.

As previously discussed, the stop lip 128 can prevent contact between the pipe end 302 and the element shoulder 1020, thereby preventing "bottoming out" of the pipe end 302 within the female socket 1010. As the fasteners 926 are tightened and the gland assembly 100 is axially translated towards the piping element 910, the pipe length 300 can translate with the gland assembly 100 due to friction between the sealing band 810 and the outer pipe surface 502.

In aspects of a mechanical joint gasket which do not define the stop lip 128, the pipe end 302 can be over-inserted into the female socket 1010 when the gasket is in the relaxed state until the pipe end 302 contacts the element shoulder 1020, or "bottoms out." In such aspects, the pipe length 300 is unable to axially translate towards the piping element 910 with the gland assembly 100 when the fasteners 926 are tightened due to interference between the pipe end 302 and the element shoulder 1020. This interference can cause binding between the gasket and the pipe length 300, which can generate residual shear stresses between the gasket and the pipe length 300. Residual shear stresses between the gasket and the pipe length 300 can compromise the quality of the seal between the gasket and the pipe length 300. In some cases, such as when the outer pipe surface 502 is rough or dirty with grit, the binding action can damage the gasket, such as be scratching or scoring cuts into the gasket, thereby compromising the seal between the gasket and the pipe length 300.

As previously described, the mechanical connection between the piping element 910, the pipe length 300, and the gland assembly 100 can be formed in a variety of different sequences. In some aspects, the gland assembly 100 can be pulled over the pipe end 302 of the pipe length 300 until the pipe end 302 seats against the stop lip 128, and then, the pipe end 302 can be inserted into the female socket 1010 of the piping element 910 together with the second gasket end 118 of the gasket 110 of the gland assembly 100. Next the gland 150 can be secured to the first flange 922 with the fasteners 926, and the fasteners 926 can be tightened to draw the gland assembly 100 towards the first flange 922, thereby compressing the sealing band 810 and forming seals between the gasket 110 and the piping element 910 and between the gasket 110 and the outer pipe surface 502.

In other aspects, the second gasket end 118 of the gasket 110 can first be inserted into the female socket 1010 of the piping element 910, and the pipe end 302 may then be stabbed into the gland assembly bore 202 until the pipe end 302 contacts the stop lip 128. Optionally, the gland assembly 100 can first be fastened to first flange 922 of the piping element 910 with the fasteners 926 in an untightened configuration, wherein the gasket 110 is in the relaxed state, before stabbing the pipe end 302 into the gland assembly bore 202. Loosely securing the piping element 910 to the gland assembly 100 with the fasteners in the untightened configuration can permit the piping element 910 and the gland assembly 100 to be handled as a single assembly, thereby simplifying the assembly process. Once the pipe end 302 has been stabbed into the gland assembly bore 202 and is in contact with the stop lip 128, the fasteners 926 can be tightened to draw the gland assembly 100 towards the first flange 922, thereby compressing the sealing band 810 and forming seals between the gasket 110 and the piping element 910 and between the gasket 110 and the outer pipe surface 502.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A gland assembly comprising:
a gland defining an annular ring and a flange portion integrally formed with the annular ring, the flange portion extending radially outward from the annular ring, the flange portion defining a plurality of fastener holes each configured to receive a fastener, each fastener hole of the plurality of fastener holes defining an axial hole length, the annular ring defining a first gland end and a second gland end disposed opposite from the first gland end, the annular ring defining a gland bore extending from the first gland end to the second gland end, the gland bore defining a gland bore length, the gland bore length being longer than the axial hole length, the flange portion positioned at the first gland end, the second gland end extending axially outward from the flange portion; and
a gasket comprising an elastic material, the gasket defining a reduced shoulder between a first gasket end and a second gasket end, and the gasket defining a pipe collar extending from the second gasket end to the reduced shoulder, the first gasket end disposed opposite from the second gasket end, a gasket bore extending through the gasket from the first gasket end to the second gasket end, the gasket bore defining an axis extending from the first gasket end to the second gasket end, a gland collar defined at the first gasket end, the gasket bore receiving the second gland end of the annular ring, the second gland end contacting the elastic material, the first gasket end being axially fixed relative to the gland along the axis.

2. The gland assembly of claim 1, wherein:
the gasket defines a stop lip at the second gasket end; and
the stop lip extends radially inward from the second gasket end with respect to the axis.

3. The gland assembly of claim 1, wherein the reduced shoulder extends radially inward from the gland collar to the pipe collar.

4. The gland assembly of claim 1, wherein:
the gland collar defines a chamfered edge; and
the chamfered edge extends radially and axially inward towards the reduced shoulder.

5. The gland assembly of claim 1, wherein:
the gland bore is coaxial to the gasket bore; and
the gland bore tapers radially and axially inward towards the gasket bore.

6. The gland assembly of claim 1, wherein:
the gland collar defines a gland collar bore portion of the gasket bore;
the gland collar bore portion receives the second gland end of the annular ring;
the gasket defines a transition chamfer within the gasket bore; and
the transition chamfer is positioned adjacent to the second gland end.

7. A gland assembly comprising:
a gland defining an annular ring and a flange portion integrally formed with the annular ring, the annular ring defining a first gland end and a second gland end disposed opposite from the first gland end, the flange portion extending radially outward from the first gland end, the second gland end extending axially outward from the flange portion, the flange portion defining a plurality of fastener holes each configured to receive a fastener; and
a gasket comprising an elastic material, the gasket defining a reduced shoulder between a first gasket end and a second gasket end, and the gasket defining a pipe collar extending from the second gasket end to the reduced shoulder, the first gasket end disposed opposite from the second gasket end, the elastic material extending from the first gasket end to the second gasket end, a gasket bore extending through the gasket from the first gasket end to the second gasket end, the gasket bore defining an axis extending from the first gasket end to the second gasket end, a gland collar defined at the first gasket end, the gasket bore receiving the second gland end of the annular ring, the first gasket end being axially fixed relative to the gland along the axis.

8. The gland assembly of claim 7, wherein:
the gasket defines a stop lip at the second gasket end; and
the stop lip extends radially inward from the second gasket end with respect to the axis.

9. The gland assembly of claim 7, wherein the reduced shoulder extends radially inward from the gland collar to the pipe collar.

10. The gland assembly of claim 7, wherein:
the gland collar defines a chamfered edge; and
the chamfered edge extends radially and axially inward towards the reduced shoulder.

11. The gland assembly of claim 7, wherein:
the gland defines a gland bore extending from the first gland end to the second gland end;
the gland bore is coaxial to the gasket bore; and
the gland bore tapers radially and axially inward towards the gasket bore.

12. The gland assembly of claim 7, wherein:
the gland collar defines a gland collar bore portion of the gasket bore;
the gland collar bore portion receives the second gland end of the annular ring;
the gasket defines a transition chamfer within the gasket bore; and
the transition chamfer is positioned adjacent to the second gland end.

13. The gland assembly of claim 7, wherein:
each fastener hole of the plurality of fastener holes defines an axial hole length;
the annular ring defines a gland bore extending from the first gland end to the second gland end;
the gland bore defines a gland bore length; and
the gland bore length is longer than the axial hole length.

14. A gland assembly comprising:
a gland defining an annular ring and a flange portion integrally formed with the annular ring, the flange portion extending radially outward from the annular ring, the flange portion defining a plurality of fastener holes each configured to receive a fastener, each fastener hole of the plurality of fasteners holes extending through the flange portion from a first side of the flange portion to a second side of the flange portion, the annular ring defining a first gland end and a second gland end disposed opposite from the first gland end, the first side aligned with the first gland end, the second side facing the second gland end, the second side axially positioned between the first gland end and the second gland end; and
a gasket defining a reduced shoulder between a first gasket end and a second gasket end, and the gasket defining a pipe collar extending from the second gasket end to the reduced shoulder, the first gasket end disposed opposite from the second gasket end, a gasket bore extending through the gasket from the first gasket end to the second gasket end, the gasket bore defining an axis extending from the first gasket end to the second gasket end, a gland collar defined at the first gasket end, the gasket bore receiving the second gland end of the annular ring to secure the gasket to the gland; and
wherein the gasket bore is adhered to the annular ring with an adhesive to axially fix the first gasket end relative to the gland along the axis.

15. The gland assembly of claim 14, wherein the gasket bore is stretched over the annular ring to secure the gasket to the gland.

16. The gland assembly of claim 14, wherein:
the gasket defines a stop lip at the second gasket end; and
the stop lip extends radially inward from the second gasket end with respect to the axis.

17. The gland assembly of claim 14, wherein:
the gland collar defines a gland collar bore portion of the gasket bore;
the gland collar bore portion receives the second gland end of the annular ring;
the gasket defines a transition chamfer within the gasket bore; and
the transition chamfer is positioned adjacent to the second gland end.

* * * * *